(12) United States Patent
Benichou et al.

(10) Patent No.: US 11,596,988 B2
(45) Date of Patent: Mar. 7, 2023

(54) METHOD AND PLANT FOR WASTE TREATMENT

(71) Applicant: PYRO GREEN INNOVATIONS, Anglet (FR)

(72) Inventors: Anne Benichou, Arsac (FR); Annie Lagoutte, Malves en Minervois (FR); Xavier Maurance, Anglet (FR); Jacques Proot, Darlington, SC (US)

(73) Assignee: PYRO GREEN INNOVATIONS, Anglet (FR)

( * ) Notice: Subject to any disclaimer, the term of this patent is extended or adjusted under 35 U.S.C. 154(b) by 1303 days.

(21) Appl. No.: 16/061,885

(22) PCT Filed: Dec. 16, 2016

(86) PCT No.: PCT/FR2016/053508
§ 371 (c)(1),
(2) Date: Jun. 13, 2018

(87) PCT Pub. No.: WO2017/103523
PCT Pub. Date: Jun. 22, 2017

(65) Prior Publication Data
US 2018/0354006 A1 Dec. 13, 2018

(30) Foreign Application Priority Data
Dec. 17, 2015 (FR) ........................ 1562625

(51) Int. Cl.
| *B09B 3/00* | (2022.01) |
| *B09B 3/29* | (2022.01) |
| *F23G 5/46* | (2006.01) |
| *F23G 5/027* | (2006.01) |
| *F23G 5/08* | (2006.01) |
| *F23G 5/16* | (2006.01) |
| *B09B 5/00* | (2006.01) |
| *B09B 3/20* | (2022.01) |
| *C10J 3/00* | (2006.01) |
| *F23G 5/12* | (2006.01) |

(52) U.S. Cl.
CPC ............... *B09B 3/29* (2022.01); *B09B 3/00* (2013.01); *B09B 3/0066* (2013.01); *B09B 3/20* (2022.01); *B09B 5/00* (2013.01); *C10J 3/00* (2013.01); *F23G 5/0276* (2013.01); *F23G 5/085* (2013.01); *F23G 5/12* (2013.01); *F23G 5/165* (2013.01); *F23G 5/46* (2013.01); *C10J 2300/09* (2013.01); *C10J 2300/1618* (2013.01); *C10J 2300/1884* (2013.01); *F23G 2200/00* (2013.01); *F23G 2202/50* (2013.01); *F23G 2206/203* (2013.01); *Y02E 20/12* (2013.01)

(58) Field of Classification Search
None
See application file for complete search history.

(56) References Cited

U.S. PATENT DOCUMENTS

| 4,017,273 | A | * | 4/1977 | Anderson | ................ | C10J 1/207 |
| | | | | | | 48/209 |
| 4,632,690 | A | * | 12/1986 | Colwell, Jr. | ............. | B09B 3/29 |
| | | | | | | 65/134.8 |
| 6,139,755 | A | * | 10/2000 | Marte | ..................... | C02F 1/725 |
| | | | | | | 422/235 |
| 7,225,643 | B1 | * | 6/2007 | Guerrero | ................ | C03B 5/193 |
| | | | | | | 65/134.8 |
| 9,139,785 | B2 | * | 9/2015 | Tsantrizos | ............... | C10J 3/723 |

FOREIGN PATENT DOCUMENTS

| CN | 113322362 | * | 8/2021 |
| EP | 1235889 | | 2/2011 |
| FR | 2710967 | | 4/1995 |
| FR | 2733031 | | 10/1996 |

OTHER PUBLICATIONS

Bar-Cohen, Avram. (2013). Encyclopedia of Thermal Packaging (Set 1) Thermal Packaging Techniques, vols. 1-6—11.1.2 Pumping Power. World Scientific. Retrieved from https://app.knovel.com/hotlink/pdf/id:kt00BUV2T1/encyclopedia-thermal/pumping-power (Year: 2013).*
International Search Report issued in International Application No. PCT/FR2016/053508 dated Mar. 1, 2017 (6 pages).
Written Opinion issued in International Application No. PCT/FR2016/053508 dated Mar. 1, 2017 (6 pages).

* cited by examiner

*Primary Examiner* — Sheng H Davis
(74) *Attorney, Agent, or Firm* — Hamre, Schumann, Mueller & Larson, P.C.

(57) ABSTRACT

The present invention relates to a method and a plant for treating carbon-containing waste that may comprise mineral fillers and/or potential contaminants.
This method comprises:
preparing a molten glass bath at a temperature between 1100° C. and 1600° C.;
loading the waste to be treated into said molten glass bath;
injecting an oxidizer and optionally a fuel under pressure into said molten glass bath by means of at least one hose, one end of which is immersed in said bath, said oxidizer being introduced in a molar amount less than the molar amount of the carbon-containing compounds, thus causing combustion of said waste and generation of hot synthesis gases;
implementing heat exchange between a heat-transfer fluid and the hot synthesis gases in conditions allowing simultaneous recovery of at least part of their heat energy and at least part of the heat energy released by their combustion, air being injected sequentially into said gases during said heat exchange to cause self-ignition of the mixture of said gases and air, each injection increasing the degree of combustion.

10 Claims, 2 Drawing Sheets

METHOD AND PLANT FOR WASTE TREATMENT

The present invention relates generally to a method and a plant for treating carbon-containing waste that may comprise mineral fillers and/or potential contaminants.

The invention finds application in all fields of waste recycling including notably in the field of recycling wastes from organic chemistry or petrochemistry, treated wood and more generally industrial final waste, whether or not hazardous, and/or household waste, comprising carbon-containing fillers and mineral fillers.

It is known that the combustion of carbon-containing waste leads to various gases depending on the initial constituents and the temperature conditions in which the chemical reactions take place. These reactions are more or less complete and generally lead to a gas mixture notably comprising carbon monoxide (CO) and hydrogen.

Thus, patent EP 1 235 889 describes a method and a plant for treating carbon-containing compounds comprising mineral fillers and/or potential contaminants, in reducing conditions, i.e. in the presence of an amount of oxidizer (oxygen) that is insufficient to allow combustion of the carbon-containing part of these compounds.

The method described in this prior document makes it possible to produce a combustible synthesis gas (syngas) while removing, by inerting (by dissolution) in a molten glass bath, the contaminants present in the carbon-containing compounds being treated.

Thus, this known method essentially comprises:
preparing a molten glass bath at a temperature between 1100° C. and 1600° C.;
loading the waste to be treated into said molten glass bath;
injecting an oxidizer and optionally a fuel under pressure into said molten glass bath by means of at least one vertical hose, one end of which is immersed in said bath, said oxidizer being introduced in a molar amount less than the molar amount of the carbon-containing compounds, thus causing combustion of said waste and generation of hot synthesis gases;
implementing heat exchange between a heat-transfer fluid and the hot synthesis gases;
cooling at least part of the molten glass so as to render it solid, thus trapping any contaminants present in the waste being treated.

In this patent EP 1 235 889, it is envisaged that the heat energy of the synthesis gases is at least partially recovered by implementing heat exchange with a heat-transfer fluid that is able, for example, to drive a turbine.

In this context, the present invention aims to propose a method and a plant for waste treatment adopting the general principles described in patent EP 1 235 889 but giving improvement of heat exchange between the heat-transfer fluid and the synthesis gases resulting from combustion of the organic part of the waste being treated, and minimizing the formation of nitrogen oxides.

Thus, according to a first aspect, the present invention relates to a method for treating carbon-containing waste comprising mineral fillers and/or potential contaminants comprising:
preparing a molten glass bath at a temperature between 1100° C. and 1600° C.;
loading the waste to be treated into said molten glass bath;
injecting an oxidizer and optionally a fuel under pressure into said molten glass bath by means of at least one hose (advantageously vertical), one end of which is immersed in said bath, said oxidizer being introduced in a molar amount less than the molar amount of the carbon-containing compounds, thus causing combustion of said waste and generation of hot synthesis gases, characterized in that it further comprises:
implementing heat exchange between a heat-transfer fluid and the hot synthesis gases in conditions allowing simultaneous recovery of at least part of their heat energy and at least part of the heat energy released by their combustion, air being injected progressively or sequentially into said gases during said heat exchange to cause self-ignition of the mixture of said gases and air, each injection increasing the degree of combustion of said gases.

It has also been found that the method and plant forming the subject matter of patent EP 1 235 889 are not optimized, notably with respect to destruction of the dioxins present in the synthesis gases generated during the treatment.

Thus, it was found that the height of the furnace containing the molten glass bath is insufficient, taking into account the up flow rate (4 meters/second) of the synthesis gases generated, to allow removal of the dioxins and/or furans present in these gases before they enter the chamber, allowing heat exchange with the heat-transfer fluid.

Thus, according to a particular feature, the method according to the invention is further characterized in that, prior to the implementation of heat exchange, it comprises holding the hot synthesis gases for a time greater than 2 seconds and at a temperature from 1200 to 1500° C. to destroy the dioxins and/or furans present in said gases.

According to another particularly advantageous feature of the method according to the invention, the hot synthesis gases, during execution of the aforementioned heat exchange, are successively:

a) cooled to a temperature above 750° C.;

b) mixed at this temperature with injected air to cause self-ignition of the mixture thus formed, combustion of the resultant gases being accompanied by a rise in their temperature up to a value below 1050° C.;

c) cooled again to a temperature above 750° C.;

operations b) and c) being repeated until a degree of combustion of the synthesis gases close to or equal to 100% is obtained;

the residual synthesis gases and the hot surrounding air being cooled to a temperature between 150 and 250° C.

According to another particular feature of this method, the waste to be treated is selected from all existing waste apart from radioactive waste, part of this waste having to be of organic nature, as will become apparent.

As stated above, the method according to the invention is carried out in reducing conditions, i.e. in the presence of an amount of an oxidizer (oxygen) insufficient to allow combustion of the carbon-containing part of the waste.

Advantageously, the oxidizer is introduced into the molten glass bath in a molar amount between 0.2 and 0.8 times the molar amount of the carbon-containing part of the waste and optionally of the fuels.

According to another feature, the oxidizer consists of pure air, oxygen or a mixture of the two, and is injected at a pressure between 0.5 and 4 atmospheres, preferably between 1 and 2 atmospheres.

According to one embodiment, the method according to the invention further comprises cooling at least part of the molten glass so as to render it solid.

According to a second aspect, the present invention relates to a plant for treating waste comprising:
- a treatment chamber forming a furnace configured to contain a molten glass bath at a temperature between 1100 and 1600° C.;
- means for loading said waste to be treated into said molten glass bath;
- optional means for loading melting additives;
- means for pressure-injecting an oxidizer and optionally a fuel into said molten glass bath by means of at least one hose, the end of which is immersed in said bath;
- a heat-exchange and combustion chamber configured for recovering at least part of the heat energy of the hot gases generated in said treatment chamber and at least part of the heat energy released by their combustion; said heat-exchange and combustion chamber comprising a coil conveying a heat-transfer fluid and means for injecting air sequentially into said gases during said heat exchange to cause self-ignition of the mixture of said gases and air thus formed.

This plant allows the method described above to be implemented.

According to a particular feature, this plant according to the invention further comprises:
- a holding (or residence) chamber, arranged between the treatment chamber and the heat-exchange and combustion chamber mentioned above, configured to allow the synthesis gases generated in said treatment chamber to be held for a time greater than 2 seconds and at a temperature from 1200 to 1500° C. to destroy the dioxins and/or furans optionally present in said gases.

According to one embodiment, the holding chamber comprises baffle-forming means, such as in particular a partition extending substantially transversely to the direction of circulation of the gases, in order to increase the circulation time and therefore the residence time of these gases at a temperature of 1200-1500° C., leading to complete destruction of the dioxins and/or furans.

Advantageously, the aforementioned heat-exchange and combustion chamber comprises, in the direction of circulation of the synthesis gases:
- a first zone configured to allow cooling of said hot synthesis gases, to a temperature above about 700° C.;
- a plurality of combustion zones of the gases configured to allow injection of air sequentially into said gases while they undergo heat exchange with the heat-transfer fluid, causing self-ignition of the mixture of said gases and air thus formed; the number of combustion zones being selected in such a way that the degree of combustion of the synthesis gases is close to or equal to 100%;
- a final zone configured to allow cooling of said residual synthesis gases or of the hot air leaving the aforementioned plurality of combustion zones, preferably to a temperature of about 200° C.

According to one embodiment of the invention, the aforementioned zones of the heat-exchange and combustion chamber are separated two at a time successively by a partition having at least one opening. This configuration prevents any flashback, so as to control combustion.

Other features and advantages of the invention will become clearer on reading the explanatory description given hereunder, which refers to the appended drawings, in which.

Figure 1:
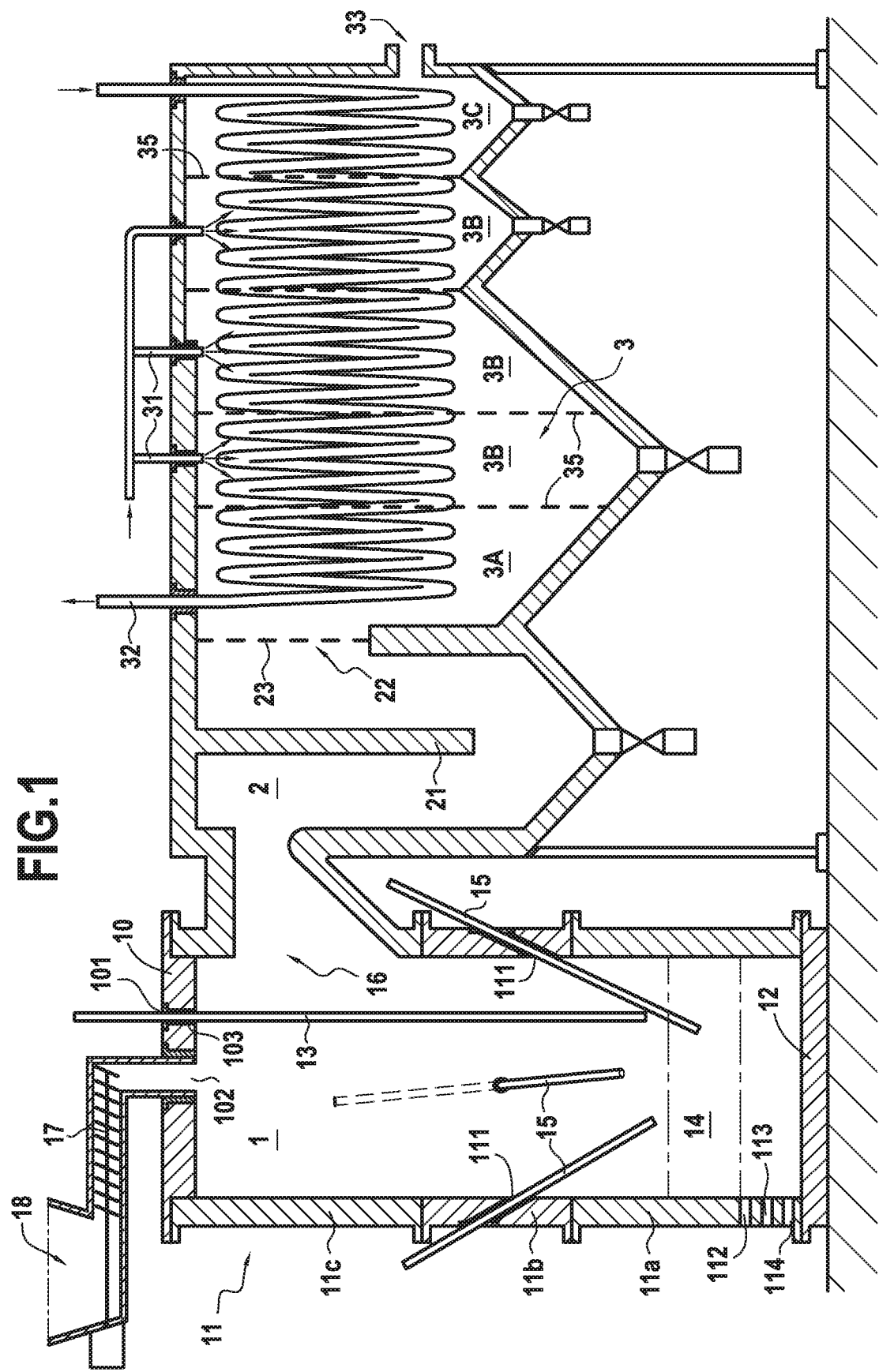
FIG. 1 is a schematic general view of a plant for treating carbon-containing waste that may comprise mineral fillers and/or potential contaminants according to the invention.

Referring to FIG. 1, the plant according to the present invention comprises essentially three parts:
- a treatment chamber forming a furnace 1;
- a holding chamber 2; and
- a heat-exchange and combustion chamber 3.

The treatment chamber 1 generally consists of a top wall 10, a side wall 11, advantageously consisting of three shell rings 11a, 11b and 11c, and a bottom wall 12 delimiting, in the embodiment shown, a vertical cylindrical enclosure with height greater than the diameter.

This enclosure may have any other shape, for example an ovoid or elliptical shape.

The dimensions of the furnace-forming treatment chamber 1 may vary, and depend, as will be understood, on the amounts of waste to be treated.

As an example, in the case of a cylindrical furnace as shown, the diameter will generally be greater than 3 m and its height will be between 6 and 12 m.

The treatment chamber 1 is intended to contain, at least in its lower portion, a molten glass bath at a temperature between 1100 and 1600° C.

For this purpose, the walls 10, 11, 12 will advantageously have a multilayer structure varying from one wall to another, which will be described hereunder from the interior to the exterior of the enclosure.

The wall 10 will thus consist of, for example:
- an inner layer of lightweight concrete with a thickness of at least 200 mm that must withstand a temperature between 1100° C. and 1600° C.;
- a layer of ceramic wool of 25 mm;
- a metal wall of heat-resistant steel about 8 mm thick.

The side wall 11 may be formed from a single piece, consisting of, from the interior to the exterior of the enclosure:
- a first layer of heavy refractory material about 220 mm thick;
- a second layer of lightweight refractory material, about 260 mm thick;
- a third layer of ceramic wool about 25 mm thick;
- a fourth metallic layer of heat-resistant steel about 8 mm thick.

According to a preferred variant embodiment, the side wall 11 will be constructed from shell rings and will consist of several elements superposed vertically (advantageously three), assembled together hermetically with flanges. Such an assembly allows easy replacement of any section of the side wall that has suffered degradation, so that said section can be repaired in the workshop before being reused. This greatly improves the service life of the plant.

Each element of this assembly will have a multilayer structure specific to its function, which will be described hereunder with reference to the embodiment shown in FIG. 1, from bottom to top.

The wall of the first element or shell ring 11a, intended to constitute the part in contact with the molten glass bath, will thus consist of, for example for a height of about 5 m:
- a first layer of heavy refractory material about 220 mm thick;
- a second layer of lightweight refractory material, about 260 mm thick;
- a third layer of ceramic wool about 25 mm thick;
- a fourth metallic layer of heat-resistant steel about 8 mm thick.

The wall of the second element or shell ring 11b, intended to constitute the middle part, will thus consist of, for example for a height of about 2.50 m from bottom to top:
- a first layer of firebrick about 220 mm thick;
- a second layer consisting of lightweight porous concrete or lightweight refractory material, about 260 mm thick;
- a third layer of ceramic wool about thick 20 mm;
- a fourth metallic layer of heat-resistant steel about 5 mm thick.

The wall of the third element or shell ring 11c, intended to constitute the upper portion of the furnace, will thus consist of, for example for a height of about 5 m from bottom to top:
- a first layer of refractory bricks or concrete, about 220 mm thick,
- a second layer consisting of lightweight porous concrete or lightweight refractory material, about 260 mm thick;
- a third layer of cellular concrete, about thick 20 mm;
- a fourth metallic layer of heat-resistant steel about 5 mm thick.

Wall 12 will preferably have a multilayer structure identical to that of the wall of shell ring 11a described above.

The heavy refractory materials that may be used in the context of the invention are generally of the silica-alumina type optionally containing chrome, with density of the order of 1700 kg/m³ to 3000 kg/m³. Their composition generally consists of a mixture of $Al_2O_3$, $SiO_2$, $Fe_2O_3$, bound by a cement of the calcium oxide (CaO) type. These materials have a temperature limit of use of up to 1800° C. depending on the nature of the binder, and their coefficients of thermal conductivity are very high. Another type of refractory that may be used is chrome-magnesia, which has physical properties similar to these silica-alumina materials, and better chemical resistance.

As will be understood, these materials will be used in the places subjected to the highest temperature stresses, and in particular for the parts intended to be in contact with the molten glass or splashes thereof.

The lightweight refractory materials (or intermediate insulators) that may be used in the context of the invention are materials with density varying from 1100 kg/m³ to 1600 kg/m³. They too are materials of the silica-alumina type.

Although in a preferred embodiment of the invention certain layers consist exclusively of lightweight refractory material, such layers may optionally be replaced at least partly with a layer of insulating material or of porous concrete, also consisting of materials of the silica-alumina type, with density varying from 400 kg/m³ to 1000 kg/m³.

Such materials generally have a lower maximum temperature of use, or at equal temperature provide insufficient mechanical strength, and cannot be used in place of the layers intended to come into contact with the molten glass.

The glass usable in the context of the present invention may consist of any amorphous inorganic material notably comprising:
- the silicate oxides and in particular silica ($SiO_2$) advantageously between 30 and 55 wt % (preferably 35%);
- the alkali-metal oxides, in particular $Na_2O$, $K_2O$, $Li_2O$, or alkaline-earth oxides (CaO, BaO, MgO) advantageously between 15 and 25 wt %; and
- iron oxide (FeO) advantageously between 25 and 45 wt % (preferably 45%).

Melting additives and in particular fluxes may be added, optionally during operation, to maintain a constant composition of the glass.

The top wall 10 of the treatment chamber comprises an opening 101 allowing passage and movement of a main hose 13 intended partly for injecting an oxidizer and optionally a fuel, preferably under pressure, and partly for injecting the pulverulent waste, into the molten glass bath 14. The opening 101 is provided with sealing means 103 consisting for example of mechanical seals or rubber sleeves.

The main hose 13 is advantageously arranged vertically or substantially vertically and preferably off-center.

According to a variant embodiment not shown, the treatment chamber 1 may be equipped with several main hoses each preferably having the same advantageously vertical off-center arrangement.

Preferably, the treatment chamber 1 will in addition be equipped with a plurality of secondary hoses 15 (preferably from 3 to 5) passing through the openings 111 provided for this purpose in the side wall 11. These secondary hoses 15 are configured and arranged to allow stirring of the molten glass bath and to prevent any risk of formation of a raft of waste on the surface of the bath. Moreover, these secondary hoses supply most of the oxygen required for syngas formation.

The use of a plurality of secondary hoses additionally makes it possible to improve overall efficiency of the plant according to the invention.

According to a preferred embodiment, these secondary hoses 15, advantageously three in number, will be arranged obliquely, in a direction forming an angle between 45 and 60° to the vertical, and immersed in the molten glass bath at variable heights to ensure efficient stirring of the molten glass bath (see FIG. 1).

Each hose 13, 15 generally consists of a hollow outer cylindrical tube consisting of a steel alloy, the diameter of the secondary hoses 15 generally being greater than that of the vertical hose or hoses 13.

The hose 13 may optionally comprise an inner cylindrical tube arranged inside the outer tube, preferably concentrically, for conveying the fuel or pulverulent waste. This inner cylindrical tube is advantageously slightly shorter than the outer tube and may be followed by homogenizing baffles (static mixer).

In the context of the present invention, "pulverulent" means any material in the form of powder having a diameter less than 1 or 2 mm.

Examples of pulverulent waste that may be conveyed by the main hose 13 notably comprise the following materials:
flour, wood dust, paint powder, extinguisher powder, carbon black, toner powder, ash, soot, filtration dusts (RPFIHR), cements, sand with filler added (sand of size 0/2 or 0/4 containing fines up to 20%—and sometimes more, in contrast to washed sand), lime, all grinding and polishing waste (adhesive, asbestos adhesives, metals), all sand blasting waste, organic acid, alumina, asbestos, antimony, clays, bentonite, manganese dioxide, wood (sawdust and flour), calcium carbonate, cellulose and cellulose derivatives, ground cereals, coal, lime (quicklime and slaked lime), chromium (salts and oxides), organic dyes, diatoms, iron (oxide) fertilizers, graphitic carbon, gypsum plaster, kaolin, magnesium (carbonate and oxide), plastics, metals in powder form, perlite, less than 2 mm, phosphates, pharmaceutical products, silica-silicates, sulfur, sugar, talc, vermiculite, less than 2 mm, etc., as well as residues from purification of gases obtained after combustion.

As the pulverulent waste is injected directly and continuously via a hose into the center of the molten glass bath, any risk of explosion is thus prevented.

Each main hose 13 comprises, at its end opposite to that intended to be immersed in the molten glass bath, a device (not shown) for supplying an oxidizer/fuel under pressure, for example via a flexible line.

As an example, the main hose 13 has a diameter of 75 mm and makes it possible to inject the oxidizer and optionally a fuel at a pressure of up to three atmospheres.

The peripheral secondary hoses 15 have a diameter of about 150 mm and allow injection of air at a pressure limited to one relative atmosphere.

The top wall 10 of the chamber 1 is also provided with an opening 102 for loading the waste to be treated, this opening 102 advantageously being provided with sealing means such as a lock chamber. This opening 102 for loading the waste to be treated will communicate, for example via an endless screw 17 (advantageously connected hermetically to the treatment chamber 1 and equipped with a heating system), with a hopper 18 mounted outside the treatment chamber 1, as described in patent EP 1 235 889.

When the pulverulent waste is dry enough, it may be introduced into the molten glass bath simultaneously with injection of the oxidizer via the main hose 13.

In the start-up phases, it is recommended to inject the oxidizer and a fuel simultaneously via the main hose 13 in order to produce a flame that will preheat the furnace and/or will maintain it at temperature during stoppages.

This fuel may be gas or fuel oil and the oxidizer will generally be air, oxygen or a mixture of the two.

The treatment chamber 1 also comprises an opening 16 made in its side wall 11, preferably located in the vicinity of the top wall 10 of the chamber 1. This opening 16 is configured to allow exhaust of the gases generated in the chamber 1 during the treatment.

This gas exhaust opening 16 communicates with the holding chamber 2, which will be described hereunder.

The treatment chamber 1 also comprises, in the lower part of the side wall 11, an opening 112 that opens directly into a channel conveying a strong current of water.

Part of the molten glass may be poured into this channel, thus obtaining a sand.

Alternatively, the glass may be poured into a tank of water, allowing it to fall from a height of about 3 meters, in such a way that the glass can acquire sufficient velocity to penetrate into the water without shattering at the surface. This results in nodules from 15 to 30 millimeters in diameter, which will be crushed to give aggregate for concrete.

According to another variant, the opening 112 opens into a reservoir or receiver, not shown, adjoining the lower part of the treatment chamber 1, and making it possible to take part of the molten glass formed after addition of the waste to be treated and optional melting additives, and lower its temperature so that it becomes solid, trapping any contaminants present in the waste.

As an example, the opening 112 for pouring molten glass is generally arranged at a height of 50 cm (measured from the bottom wall 12).

The reservoir or receiver, of known design, is open in its upper part delimited by a wall whose top edge is just above the mean level of the molten glass bath in the treatment chamber 1. As will be understood, the molten glass may thus flow through the opening 112 to fill the reservoir to a height approximately equal to that of the molten glass in the treatment chamber 1.

The upper part of the wall of this reservoir further comprises a channel that may be sealed, notably with clay, between two successive pourings of glass. This channel, thus sealed, may be pierced mechanically or thermally.

Reference may be made to document EP 1 235 889 for a more detailed description of this part of the plant.

The treatment chamber 1 may also comprise, at the level of the bottom wall 12, an opening 113 (sealed in operation) notably allowing the chamber to be emptied for maintenance.

The treatment chamber 1 may also comprise, at the level of the bottom wall 12, an opening 114, located between openings 112 and 113, sealed in operation, for emptying the nonferrous metals contained in the inputs.

The holding chamber 2 is generally arranged between the treatment chamber 1 and the heat-exchange and combustion chamber 3 that will be described hereunder.

This holding chamber communicates via opening 16 with the treatment chamber 1 and is of a configuration to allow the hot synthesis gases generated in the treatment chamber 1 to be held for a time and at a temperature sufficient to guarantee total destruction of the dioxins and/or furans present in said gases.

The synthesis hot gases (1200 to 1500° C.) generated in treatment chamber 1 by combustion of the organic part of the waste to be treated may contain dioxins and furans. In fact, taking into account the ascending velocity of the synthesis gases and the height (limited for reasons of space) of said treatment chamber, it was found that the organic particles present in the treatment chamber 1 generally do not have time to be destroyed completely.

According to the present invention, the holding chamber 2 guarantees total destruction of these dioxins and furans.

According to a particular feature, the holding chamber 2 comprises baffle-forming means, so as to impose a zigzag path on the gases passing through it, in order to increase the residence time and in any case hold them for a time greater than 2 seconds and at a temperature from 1200 to 1500° C. inside the holding chamber 2, to guarantee total destruction of the dioxins and furans.

In a preferred embodiment, the holding chamber is of a cylindrical cone shape and comprises a partition 21 extending approximately transversely to the direction of circulation of the gases, i.e. parallel to the longitudinal axis of the holding chamber 2, over a major part of the height of the latter, in order to increase the circulation time and therefore the residence time of these gases at a temperature of 1200-1500° C., leading to complete destruction of the dioxins and/or furans.

The walls defining the holding chamber 2 have a multi-layer structure identical to that described above with reference to wall 11c of the treatment chamber 1.

As an example, the height of the holding chamber 2 may be of the order of 5 to 10 m.

As the hot synthesis gases move at a velocity of about 4 m/s, their circulation time greater than 2 seconds in the holding chamber 2, where the temperature is generally of the order of 1200 to 1500° C., guarantees total destruction of the dioxins and furans.

The holding chamber 2 is advantageously equipped in its lower part with a high-temperature separator that allows any dust that settles in said chamber to be evacuated. This dust may be injected back into the molten glass bath.

The side wall of the holding chamber 2 further comprises an opening 22 communicating with the heat-exchange and combustion chamber 3.

In general, the heat-exchange and combustion chamber 3 comprises, in the direction of circulation of the synthesis gases:
  a first zone 3A configured to allow cooling of said hot synthesis gases, to a temperature above about 750° C.;
  a plurality of zones 3B for combustion of the gases, each comprising air injection means 31;

a final zone 3C configured to allow cooling of the residual synthesis gases or hot air leaving the plurality of combustion zones 3B, preferably to a temperature of about 200° C.

The heat-exchange and combustion chamber 3 is provided with a coil 32 conveying a heat-transfer fluid, for example water, and passing through zones 3A, 3B and 3C.

Zones 3A, 3B in their plurality and 3C are delimited by a perforated wall 35, or septum, allowing passage of the gases at a maximum temperature of 1050° C. and consisting of insulating materials or porous concrete.

The heat-transfer fluid circulates in countercurrent inside the coil 32. i.e. in a direction opposite to the direction of circulation of the gases.

This heat-transfer fluid is preferably water, which will give steam. It may also be compressed air, which will undergo thermal expansion during exchange and will be able to drive a turbine.

The injection means 31 are configured for injecting air sequentially into the gases while they undergo heat exchange with the heat-transfer fluid, causing self-ignition of the mixture of said gases and air thus formed.

The combustion air will be injected by a fan, not shown, at a sufficient velocity to allow penetration and good mixing with the gases to be burnt, which can easily be determined by a person skilled in the art. Injection at each point will be adjusted for example in a known manner by means of a modulating valve controlled by thermocouples.

As an example, the synthesis gases enter zone 3A at a temperature of the order of 1200° C. and are cooled by the heat-transfer fluid to a temperature of about 800° C. before entering the first combustion zone 3B.

In each combustion zone 3B, air is injected into said gases sequentially (the frequency of injection being adjusted to the velocity of movement of the gases), which causes self-ignition.

This self-ignition leads to an increase in the temperature of the synthesis gases to a value of about 1000° C. and then these gases cool to a temperature of about 800° C. in contact with the heat-transfer fluid before entering the next combustion zone 3B.

The number of combustion zones 3B is selected in such a way that the degree of combustion of the synthesis gases is at least 90%, preferably close to 100% or equal to 100% prior to arrival in the last zone 3C.

Air will be injected, in each combustion zone 3B, in an amount such that the temperature generated by self-ignition in each of the combustion zones 3B remains below 1050° C. in order to limit the formation of nitrogen oxides.

For this purpose, each combustion zone 3B will be equipped with a temperature sensor controlling a modulating valve introducing combustion air into said zone.

In general, cooling of the gases in the combustion zones 3B to a temperature below 650° C. will also be avoided, to prevent the appearance of soot while CO is still present in the gas.

In the example illustrated in FIG. 1, the plant comprises three combustion zones 3B.

Figure 2:
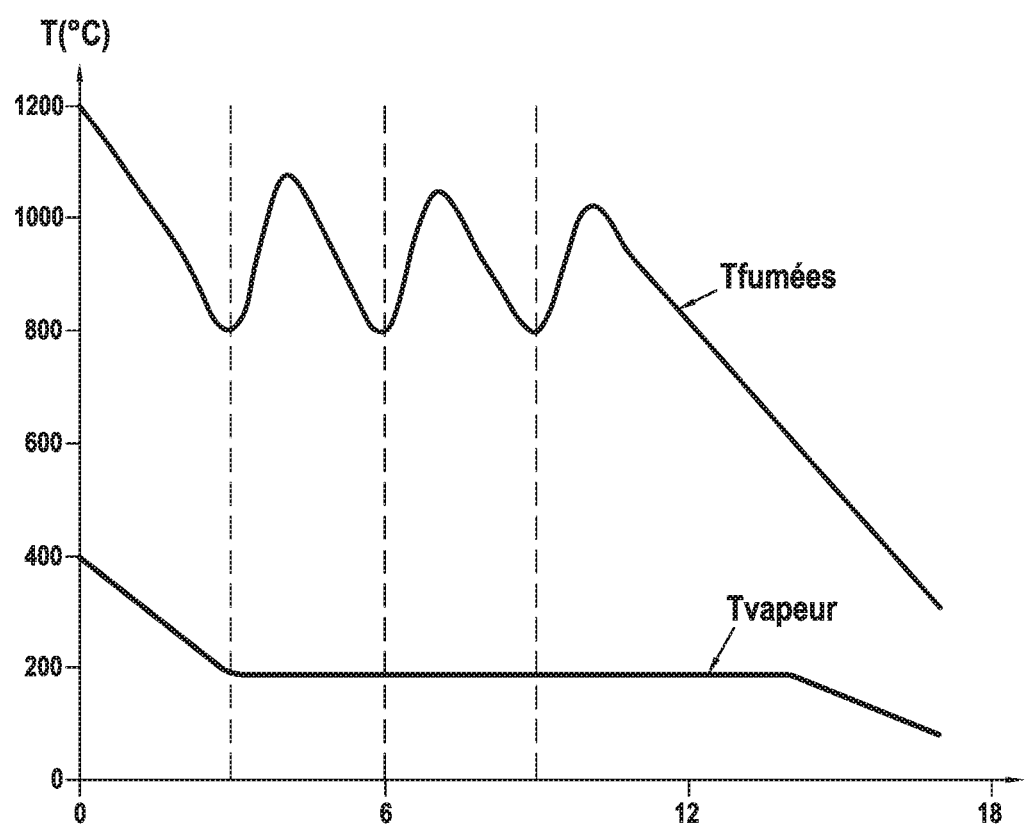
FIG. 2 is a graph illustrating the variation of the temperature of the gradual combustion of the synthesis gases in the heat-exchange and combustion chamber according to the invention.

FIG. 2 shows the temperature variations of the synthesis gases and of the heat-transfer fluid (water-steam) during their passage inside the heat-exchange and combustion chamber according to the invention.

The residual synthesis gases or the hot air entering zone 3C are cooled to a temperature of about 200° C. to 300° C. to be led via an opening 33 to a purification device, not shown.

This zone will be equipped with means for pulverizing sodium carbonate or optionally calcium carbonate or lime in order to trap gaseous chlorine, arsenic, sulfur, and precipitate them for reinjection into the molten glass bath via the main hose 13, where they will be dissolved directly in the amorphous glass matrix.

This zone will also be equipped with means for injecting hydrogen peroxide in order to cause, if applicable, precipitation of mercury in the form of mercury oxide. The latter will be injected directly into the molten glass bath, via the main hose 13, and will be dissolved directly in the amorphous glass matrix.

Zone 3A will also be equipped with means for injecting a mixture of water and urea (preferably in an amount of 32.5%) in order to reduce the NO, to nitrogen $N_2$, which will be discharged via the chimney.

The heat-transfer fluid circulating in the coil 32 enters the last zone 3C at a pressure that will be selected as a function of the application envisaged. For example, for steam, water will be received at 80° C. and at a pressure of 12 to 100 bar. This fluid passes through the combustion zones 3B and then the first cooling zone 3A in countercurrent to leave in the form of steam at a temperature of the order of 300 to 500° C. depending on the application envisaged. In the case of a turbine, air will be received at 300° C. and at 10 bar. It will exit at 950° C.

The invention will now be illustrated with an example.

This example aims to illustrate the value of steam production obtained using the plant according to the invention, starting from a given mixture of five wastes, introduced into the molten glass bath.

This mixture consists of:

RSF (Recovered Solid Fuels) obtained after a step of grinding and manual and densimetric sorting of nonhazardous waste consisting primarily of mixed nonhazardous bulk waste and waste from economic activity. RSF is produced from the nonmarketable fraction resulting from this sorting:

RPFIHR (Residues from Purification of Fumes from Incineration of Household Refuse) obtained from a unit for treatment and energy recycling of household waste and the like. RPFIHR are classified as hazardous waste:

HR (Household Refuse) obtained from a unit for treatment and energy recycling of household waste and the like where separation of packaging and glass at source has been implemented:

HYDROCARBON-CONTAINING SLUDGES such as those that may be received from a firm for industrial and harbor maintenance and collection of hazardous and non-hazardous waste. They are derived from activities of maintenance of vehicle washing roadways and maintenance of the deoiling drums of fuel distribution stations:

WCAIR (Waste from Care Activities with Infectious Risk), whether or not decontaminated. The decontamination process is a known method for transforming this waste, initially hazardous, completely automatically by grinding and steam sterilization. The end product consists of sterilized ground products (granulometry<4 cm), comparable to household refuse (HR), which can join the municipal waste stream.

The elemental analysis of this waste is presented in Table 1 below:

TABLE 1

| Charge | Water content, % | C % | H % | O % | NCV kcal |
|---|---|---|---|---|---|
| RSF | 7.4 | 47.57 | 6.81 | 44.65 | 4133 |
| RPFIHR | 3.0 | 2.30 | 1.00 | 0 | 425 |
| HR | 30.9 | 48.50 | 6.60 | 33.80 | 5458 |
| Hydro sludge | 25.3 | 22.80 | 3.10 | 7.30 | 2794 |
| WCAIR | 39.5 | 69.30 | 11.00 | 8.23 | 6981 |

In this table, NCV denotes the net calorific value expressed in kilocalories.

a) Preparation of a Molten Glass Bath:

A furnace with a diameter of 3 and a height of 12.50 meters, as described above, was used in this example.

This vacuum furnace was preheated for about 2 hours at a temperature of about 1200° C., by means of an extra burner lowered into the furnace at the end of a cable.

When the temperature inside the furnace reached about 1200° C., glass obtained from a granulated vitrified product in a previous heat was slowly introduced.

During this step, the temperature is maintained at about 1200° C. by means of the main hose 13 supplying a flame obtained from the combustion of a mixture of air and natural gas, in a sub-stoichiometric ratio of 0.9.

When the level of molten glass inside the furnace reached a height of 50 cm, the three secondary hoses 15 were immersed in the molten glass bath in order to maintain a temperature of 1200° C. The flames submerged in the glass bath give the process excellent efficiency and prevent the formation of a raft on the surface of the molten glass.

b) Introduction of the Mixture of Waste

A mixture of waste was used in this example, with the following respective proportions of each waste: 15.6% of RSF, 3.1% of RPFIHR, 40.7% of HR, 21.9% of hydrocarbon-containing sludges and 18.7% of WCAIR, having the elemental analysis presented in Table 1.

The above data assume a rate of consumption of mixture of 4167 kg/h.

TABLE 2

| Charge | kg/h | t/year |
|---|---|---|
| RSF | 651 | 5000 |
| RPFIHR | 130 | 1000 |
| HR | 1693 | 13 000 |
| Hydrocarbon-containing sludges | 911 | 7000 |
| WCAIR | 781 | 6000 |
| total | 4167 | 32 000 |

This 4167 kg/h (which contains 1337 kg of carbon and 192 kg of hydrogen) is fed into the furnace with injection of 8427 Nm³/h of air.

The mineral component of this mixture requires addition of some fluxes, mainly iron (in the form of fine scrap metal) at a rate of 390 kg/h to obtain the optimal composition of the glass.

After 24 hours of production, the level in the furnace had reached 1.8 m and the molten glass obtained had the following composition:
$SiO_2$: 30 wt %;
FeO: 44 wt %
alkali-metal and alkaline-earth oxides: 25 wt %;
minor components: 0.5 wt %

The three secondary hoses 15 were then raised to stop the stirring of the glass while maintaining the bath temperature for about 10 minutes.

The resultant production rate was 940 kg/h or 22.560 tonnes/day of molten glass, which was drawn off in a single step every 24 hours, leaving a base of molten glass bath with a height of about 50 cm in the furnace.

c) Energy Balance

TABLE 3

| % $O_2$ in the air | 21 |
|---|---|
| Nm³ gas produced (wet) | 12 700 |
| Wet analysis | |
| $H_2$ % | 9.2 |
| CO % | 10.9 |
| $CO_2$ % | 8.8 |
| $H_2O$ % | 18.7 |
| $N_2$ % | 52.4 |

The synthesis gas (syngas) produced has a wet NCV of 2.5 MJ/Nm³.

In this example, this syngas was used in a plant according to the invention, with a water/steam mixture circulating in countercurrent in the heat exchanger.

The gas was cooled in a first zone of the exchanger to a temperature of 700/800° C., then air was introduced gradually until combustion was complete, while avoiding exceeding 1000° C.

In total, 6676 Nm³/h of air (with 10% excess) was used.

The fumes, after purification, were discharged from the chimney at 200° C.

The net energy recovery in the form of heat by partial cooling of the gas followed by its combustion was 12.5 $MW_{th}$ (thermal megawatt).

It can thus be seen that the method and plant according to the present invention give a considerable improvement in heat exchange between the heat-transfer fluid and the synthesis gases resulting from combustion of the organic part of the waste being treated.

Furthermore, the inventors found that the method according to the present invention made it possible to prevent the formation of nitrogen oxides notably because the temperature generated by self-ignition of the gases was controlled to remain below 1050° C., the temperature above which the nitrogen oxides form.

The invention claimed is:

1. A method for treating carbon-containing waste comprising:
   preparing a molten glass bath at a temperature between 1100° C. and 1600° C.;
   loading the carbon-containing waste to be treated into said molten glass bath;
   injecting an oxidizer, and optionally a fuel under pressure, into said molten glass bath by means of at least one hose, one end of which is immersed in said molten glass bath, said oxidizer being introduced in a molar amount less than a molar amount of the carbon-containing waste to cause combustion of said carbon-containing waste and to generate hot synthesis gases;
   implementing heat exchange between a heat-transfer fluid and the hot synthesis gases in conditions allowing simultaneous recovery of at least part of their heat energy and at least part of heat energy released by the combustion;

injecting air sequentially into said hot synthesis gases during said heat exchange to cause self-ignition of a mixture of said hot synthesis gases and the air, each injection increasing a degree of combustion, said air being injected in an amount such that a temperature generated by self-ignition remains below 1050° C. in order to limit formation of nitrogen oxides, wherein, prior to carrying out the heat exchange, holding the hot synthesis gases for a time greater than 2 seconds and at a temperature from 1200 to 1500° C. to destroy at least one of dioxins and furans optionally present in said hot synthesis gases.

2. The method of treatment as claimed in claim 1, wherein said carbon-containing waste to be treated is selected from organic-containing wastes apart from radioactive waste.

3. The method of treatment as claimed in claim 1, wherein the oxidizer consists of pure air, oxygen or a mixture of the two and in that the oxidizer is injected at a pressure between 0.5 and 4 atmospheres.

4. The method of treatment as claimed in claim 1, further comprising cooling at least part of molten glass in the molten glass bath so as to render it solid.

5. The method of treatment as claimed in claim 1, wherein the oxidizer is introduced into the molten glass bath in a molar amount between 0.2 and 0.8 times a molar amount of a carbon-containing part of said carbon-containing waste and optionally of the fuel.

6. A method for treating carbon-containing waste comprising:
preparing a molten glass bath at a temperature between 1100° C. and 1600° C.;
loading the carbon-containing waste to be treated into said molten glass bath;
injecting an oxidizer, and optionally a fuel under pressure, into said molten glass bath by means of at least one hose, one end of which is immersed in said molten glass bath, said oxidizer being introduced in a molar amount less than a molar amount of the carbon-containing waste to cause combustion of said carbon-containing waste and to generate hot synthesis gases;
implementing heat exchange between a heat-transfer fluid and the hot synthesis gases in conditions allowing simultaneous recovery of at least part of their heat energy and at least part of heat energy released by the combustion;
injecting air sequentially into said hot synthesis gases during said heat exchange to cause self-ignition of a mixture of said hot synthesis gases and the air, each injection increasing a degree of combustion, said air being injected in an amount such that a temperature generated by self-ignition remains below 1050° C. in order to limit formation of nitrogen oxides,
wherein during execution of the heat exchange, the hot synthesis gases are successively:
a) cooled to a temperature above 750° C.;
b) mixed at this temperature with the injected air to cause the self-ignition of the mixture thus formed, combustion of the mixture of said hot synthesis gas and the air being accompanied by a rise in their temperature up to a value below 1050° C.;
c) cooled again to a temperature above 750° C.;
the aforementioned operations b) and c) being repeated until the degree of combustion of said hot synthesis gases close to or equal to 100% is obtained;
residual synthesis gases and hot surrounding air being cooled to a temperature between 150 and 250° C.

7. The method of treatment as claimed in claim 6, wherein said carbon-containing waste to be treated is selected from organic-containing wastes apart from radioactive waste.

8. The method of treatment as claimed in claim 6, wherein the oxidizer consists of pure air, oxygen or a mixture of the two and in that the oxidizer is injected at a pressure between 0.5 and 4 atmospheres.

9. The method of treatment as claimed in claim 6, further comprising cooling at least part of molten glass in the molten glass bath so as to render it solid.

10. The method of treatment as claimed in claim 6, wherein the oxidizer is introduced into the molten glass bath in a molar amount between 0.2 and 0.8 times a molar amount of a carbon-containing part of said carbon-containing waste and optionally of the fuel.

\* \* \* \* \*